(12) United States Patent
Zou et al.

(10) Patent No.: US 8,135,422 B2
(45) Date of Patent: Mar. 13, 2012

(54) DEVICE AND METHOD FOR REALIZING SHORT MESSAGE NOTIFICATION SERVICE FOR MISSING CALLS

(75) Inventors: Fengshao Zou, Shenzhen (CN); Shiqian Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 906 days.

(21) Appl. No.: 11/878,863

(22) Filed: Jul. 27, 2007

(65) Prior Publication Data

US 2008/0051121 A1 Feb. 28, 2008

Related U.S. Application Data

(63) Continuation of application No. PCT/CN2006/000063, filed on Jan. 16, 2006.

(30) Foreign Application Priority Data

Jan. 27, 2005 (CN) .......................... 2005 1 0002997

(51) Int. Cl.
*H04W 4/00* (2009.01)
(52) U.S. Cl. ..... 455/466; 455/70; 455/412.2; 455/426.1; 455/455; 455/412.1; 709/203; 709/206; 709/217; 709/223; 379/70; 379/210.01; 379/204.02
(58) Field of Classification Search ............... 455/412.1, 455/412.2, 466, 70, 426.1, 555; 709/203, 709/206, 217, 223
See application file for complete search history.

(56) References Cited

U.S. PATENT DOCUMENTS 6,799,017 B1 9/2004 Kregel
6,882,828 B1* 4/2005 Kregel ........................... 455/70
7,493,381 B2* 2/2009 Garg ............................. 709/223
2006/0104429 A1* 5/2006 Wouterse et al. ........ 379/210.01

FOREIGN PATENT DOCUMENTS

CN 1434642 A 8/2003
(Continued)

OTHER PUBLICATIONS

Foreign communication from a counterpart application, Chinese application 200510002997.5, Office Action dated Oct. 10, 2008, 5 pages.
Foreign communication from a counterpart application, Chinese application 200510002997.5, Partial English Translation Office Action dated Oct. 10, 2008, 3 pages.
Foreign communication from a counterpart application, PCT application PCT/CN2006/000063, English Translation International Search Report dated Apr. 6, 2006, 2 pages.
Foreign communication from a counterpart application, PCT application PCT/CN2006/000063, English Translation Written Opinion dated Feb. 27, 2006, 3 pages.

(Continued)

*Primary Examiner* — Dwayne Bost
*Assistant Examiner* — Amancio Gonzalez
(74) *Attorney, Agent, or Firm* — Conley Rose, P.C.; Grant Rodolph

(57) ABSTRACT

A missing-call short message notification device includes: a main control module for controlling and scheduling other modules; a relay signaling processing module for receiving information sent by the switching device and sending information to the switching device; a short message constructing module for constructing a missing-call short message; a short message sending module for sending the constructed message to the called user. A method for realizing short message notification service for missing calls includes: a called user sets a call forward number to be a missing-call short message notification number; a switching device detects that a call from a calling user to a called user is not put through, and sends information of the calling user to an MCND based on the call forward number; the MCND constructs a missing-call short message based on the information of the calling user and sends the constructed message to the called user.

13 Claims, 4 Drawing Sheets

FOREIGN PATENT DOCUMENTS

| CN | 1509090 A | 6/2004 |
| KR | 2001/0079195 A | 8/2001 |
| KR | 20050007912 A | 1/2005 |
| WO | WO 03077570 A1 | 9/2003 |

* cited by examiner

DEVICE AND METHOD FOR REALIZING SHORT MESSAGE NOTIFICATION SERVICE FOR MISSING CALLS

CROSS-REFERENCE TO RELATED APPLICATIONS

This application is a continuation of International Application PCT/CN2006/000063 filed Jan. 16, 2006, which claims priority to Chinese patent application 200510002997.5 filed Jan. 27, 2005.

FIELD OF THE TECHNOLOGY

The present invention relates to communication technologies, and particularly, to a device and method for realizing a short message notification service for missing calls.

BACKGROUND OF THE INVENTION

In a communication system, especially in a mobile communication system, when a user is inaccessible, for example, when the user is outside the service area, when the user equipment is turned off, when the user is busy or when the user has subscribed to a service of Do Not Disturb (DND), a call from other users cannot be put through, i.e. the call to the user is not finished. In this case, generally, the called user cannot know whether he is called by another user, because the called user cannot acquire the call information about the calling user. Thus, the called user may miss some important calls.

To solve the problem, in the case that there is a missing call to a called user, two service solutions for notifying the called user of the missing call are proposed in the prior art.

In one service solution, a called Home Location Register (HLR) in the existing network constructs a missing-call short message containing at least the calling number and the current time, and sends the constructed missing-call short message to the called home Short Message Center (SMC); the called home SMC sends the missing-call short message to the called user when the called user is accessible. Here, the called user being accessible means that the called user is in a normal operating state and thus may receive a short message sent by the home SMC.

In the above first service solution, all the HLRs in the existing network need to be upgraded to enable the HLRs to construct and send the missing-call short message containing at least the calling number and the current time upon detecting that there is a missing call. In the above first service solution, a called user needs to subscribe to the short message notification service for missing calls in the home HLR. When detecting a missing call, the called HLR first checks whether the called user has subscribed to a service of Call Forward Busy or a service of Call Forward No Answer; if the called user has subscribed to the service of Call Forward Busy or the service of Call Forward No Answer, the called HLR triggers the service of Call Forward Busy or the service of Call Forward No Answer and continues with the processing based on the procedure of the service of Call Forward Busy or the service of Call Forward No Answer. Otherwise, the called HLR checks whether the called user has subscribed to the short message notification service for missing calls; if the called user has subscribed to the short message notification service for missing calls, the called HLR constructs a missing-call short message and sends the constructed missing-call short message to the called home SMC, and the called home SMC sends the missing-call short message to the called user when the called user is accessible. The called HLR returns a forward rejection to the calling end office if the called user has not subscribed to the short message notification service for missing calls.

In another service solution, a voice mailbox is used to notify a called user of a missing call. When detecting a missing call, the called HLR triggers the forward service and forwards the call to the voice mailbox of the called user based on an ordinary procedure of the forward service, and the calling user may leave a message in the voice mailbox of the called user. Thus, the called user may acquire the message of the calling user by accessing the voice mailbox of the called user.

In the above second service solution, the called user needs to subscribe in the home HLR to the service of Call Forward Busy or the service of Call Forward No Answer and set the forward number as the number of the voice mailbox of the called user. Thus, when the calling user calls the called user and the call cannot be put through, the call may be forwarded by the called HLR to the mailbox of the called user based on the ordinary procedure of the forward service.

In the above first service solution, all the HLRs in the existing network need to be upgraded to enable the HLRs to construct and send a missing call short message. Therefore, it is of much significance to the existing network to implement the first service solution, and it is very difficult to implement the solution and the cost is very high, which is very unfavorable for the spreading and application of the notification services for missing calls.

In the above second service solution, the calling user needs to connect to the voice mailbox and leave a message therein, thus the called user cannot in time acquire enough information about the calling user if the calling user did not leave a message or the calling user did not leave the identification information thereof after connecting to the voice mailbox. In addition, for leaving a message, the calling user needs to connect to the voice mailbox of the called user and pay for the call; for acquiring the message, the called user needs to access the voice mailbox and pay for the call too. Therefore, with the second service solution, it is possible that the called user cannot in time acquire enough information about the calling user, and both the calling user and the called user pay for the call, which is also very unfavorable for the spreading and application of the notification services for missing calls.

SUMMARY OF THE INVENTION

A missing-call short message notification device, includes:
a main control module capable of controlling and scheduling other modules in the device;
a relay signaling processing module capable of sending information received from a switching device to the main control module, and sending information to the switching device based on an instruction of the main control module;
a short message constructing module capable of constructing a missing-call short message based on an instruction of the main control module, and sending the missing-call short message to a short message sending module through the main control module;
the short message sending module capable of sending the missing-call short message constructed by the short message constructing module to a called user; wherein
the relay signaling processing module, the short message constructing module and the short message sending module directly communicate with the main control module, respectively.

A method for realizing a short message notification service for missing calls, includes:

sending, by a switching device and when a call from a calling user to a called user is not put through, call information of the calling user to a missing-call short message notification device based on a call forward number, wherein the call forward number is set to be an unfinished-call short message notification number; and constructing, by the missing-call short message notification device, a missing-call short message based on the call information of the calling user and sending the constructed missing-call short message to the called user.

The following description and drawings set forth in detail a number of illustrative embodiments of the invention. These embodiments are indicative of but a few of the various ways in which the present invention may be utilized.

EMBODIMENTS OF THE INVENTION

The present invention is hereinafter further described in details with reference to the drawings as well as embodiments so as to make the objective, technical solution and merits thereof more apparent.

Figure 1:
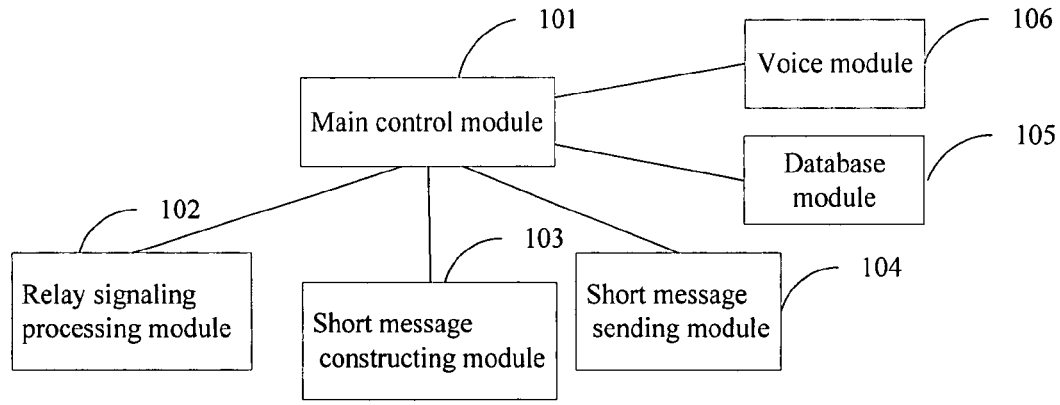
FIG. 1 is a block diagram illustrating the structure of a Missing Call Notification Device (MCND) according to embodiments of the present invention.

FIG. 1 shows the block diagram illustrating the structure of an MCND according to embodiments of the present invention. As shown in FIG. 1, the MCND includes at least: a main control module 101, a relay signaling processing module 102, a short message constructing module 103 and a short message sending module 104. The relay signaling processing module 102, the short message constructing module 103 and the short message sending module 104 are directly connected to the main control module 101, respectively.

The main control module 101 is used for receiving service information reported by other modules in the MCND, such as the relay signaling processing module 102, the short message constructing module 103 and the short message sending module 104, and for sending control and scheduling information to other modules in the MCND, such as the relay signaling processing module 102, the short message constructing module 103 and the short message sending module 104, so as to control and schedule the other modules in the MCND.

The relay signaling processing module 102 is used for receiving information, such as the calling number, from a switching device, reporting the information received from the switching device to the main control module 101, and sending information to the switching device based on an instruction received from the main control module 101, so as to implements a function of interacting between the MCND and the switching device. In a mobile communication network, the switching device may be an MSC, a VLR or an HLR; while in a public telephone network, the switching device may be an exchange at the switching end office.

The short message constructing module 103 is used for constructing a missing-call short message based on an instruction containing information about the calling number and received from the main control module 101, and sending the constructed missing-call short message to the short message sending module 104 through the main control module 101. The missing-call short message constructed by the short message constructing module 103 contains at least the calling number and the current time.

The short message sending module 104 is used for sending the missing-call short message constructed by the short message constructing module 103 to the called user. Specifically, in the mobile communication network, the short message sending module 104 may first send the missing-call short message to the called home SMC, and the called home SMC sends the missing-call short message to the called user when the called user is accessible. In the public telephone network, the short message sending module 104 may directly send the missing-call short message to the called user.

As to external interfaces of the MCND, the MCND may be connected to the SMC with Mobile Application Part (MAP) signaling, so as to support Short Message Delivery Point to Point (SMDPP) messages. The MCND may be connected to the MSC/VLR with relay signaling so as to support the relay signaling such as the Telephone User Part/ISDN (Integrated Services Digital Network) User Part (TUP/ISUP) relay signaling.

In addition, if some data need to be stored in the MCND, the MCND may further include a database module 105 directly connected to the main control module 101 and used for storing or outputting data based on an instruction of the main control module 101. Moreover, the database module 105 may contain only subscription information of users so as to check whether the users have activated the short message notification service for missing calls.

If a voice needs to be played, for example for prompting the calling user that "the called user has been notified", the MCND may further include a voice module 106 which is directly connected to the main control module 101 and used for playing a voice based on an instruction of the main control module 101.

The position of the MCND in the network is not changeless and may be flexibly configured based on the actual situation. In general, the MCND may be configured at the position where the Gateway Mobile Switching Center (GMSC) is located or be directly connected to the GMSC.

Figure 2:
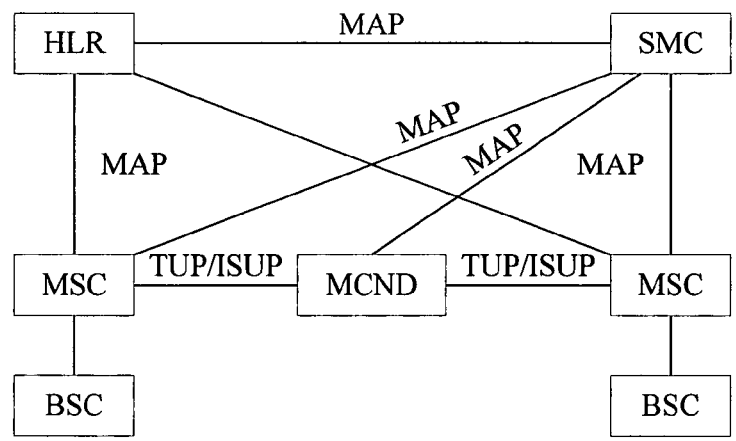
FIG. 2 is a schematic diagram illustrating the position of the MCND in the network according to an embodiment of the present invention.

FIG. 2 shows the schematic diagram illustrating the position of the MCND in the network according to an embodiment of the present invention. As shown in FIG. 2, the MCND may interact with the SMC through the MAP signaling, send an SMDPP message to the SMC and receive an smdpp response message returned by the SMC. Meanwhile, the MCND may interact with the MSC/VLR through the relay signaling such as the TUP/ISUP relay signaling, so as to enable the calling MSC/VLR to be routed to the MCND based on a missing-call short message notification number, and the MCND may receive an Initial Address Message (IAM) sent by the calling MSC/VLR and send a Release Complete (RLC) message to the calling MSC/VLR.

Figure 3:
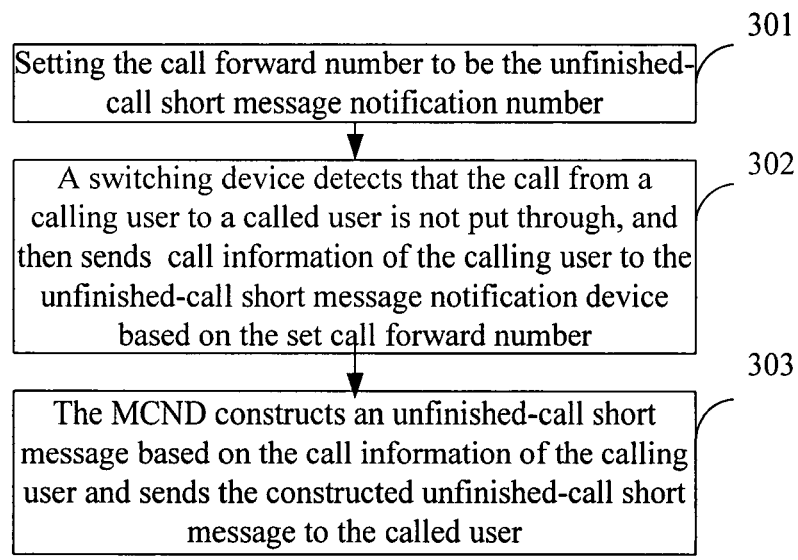
FIG. 3 is a flow chart illustrating a general technical solution implementing the short message notification service for missing calls according to embodiments of the present invention.

The MCND may be used to implement the short message notification service for missing calls after the position of the MCND in the network has been configured. FIG. 3 shows the flow chart illustrating the general technical solution of the short message notification service for missing calls according to embodiments of the present invention, which is based on the MCND shown in FIGS. 1 and 2. As shown in FIG. 3, the method includes the following steps.

Block 301: the call forward number is set as the missing-call short message notification number.

Block 302: the switching device detects that the call from a calling user to the called user is not put through, and sends the call information of the calling user to the MCND based on the set call forward number.

Block 303: the MCND constructs the missing-call short message based on the call information of the calling user and sends the constructed missing-call short message to the called user.

The missing-call short message notification number in Block 301 is a number allocated by the MCND for a user, and may take the form of a combination of a prefix and the called number, a combination of a prefix and an allocated number, or a public number. The prefix and the public number are set by the MCND uniformly and in a default manner, for example, to be 300 and 600. Thus, the switching device may be routed to the MCND based on the prefix or the public number.

The missing-call short message notification number may be allocated by the MCND for the user based on an application of the user before the user registers the call forward, or may be allocated by the MCND on its own initiative based on triggering of the communication system when the user activates the short message notification service for missing calls.

In the case that the missing-call short message notification number allocated by the MCND for the user has the format of the combination of a prefix and the called number or the combination of a prefix and an allocated number, the information sent by the switching device to the MCND does not contain the information about the called user in general, and thus the MCND cannot directly acquire the called number from the information sent by the switching device to the MCND. However, since the switching device provides the call forward number to the MCND when sending routing information to the MCND and the call forward number has already been set as the missing-call short message notification number, the called number may be directly stored into the missing-call short message notification number as the call forward number or be stored into the corresponding relation between call forward numbers and called numbers in the database module 105.

If the missing-call short message notification number has the format of the combination of a prefix and the called number, the MCND may directly acquire the called number based on a called number portion of the missing-call short message notification number. If the missing-call short message notification number has the format of the combination of a prefix and an allocated number, the MCND may acquire the called number from the corresponding relation between call forward numbers and called numbers by inquiring the database module 105 based on the call forward number.

In the case that the missing-call short message notification number allocated by the MCND for the user has the format of a public number, the information sent by the switching device to the MCND should contain the information about the called user, and thus the MCND directly acquires the called number from the information sent by the switching device to the MCND. In such a case, the corresponding switching device needs to be upgraded so as to make the switching device carry the information about the called user in the information sent to the MCND.

In addition, a user may subscribe to the short message notification service for missing calls in the MCND or the HLR, or directly subscribe to the short message notification service for missing calls in an operating office. If the user subscribes to the short message notification service for missing calls in the MCND, the user may directly make the subscription after the MCND allocates the missing-call short message notification number for the user. In this case, the MCND checks whether a user has subscribed to the short message notification service for missing calls.

If the user subscribes to the short message notification service for missing calls in the HLR, the user may implement the subscription by dialing a service code after the MCND allocates the missing-call short message notification number for the user. For example, if the service code "81" denotes a subscription, while the service code "80" denotes a de-subscription, the user may subscribe to the service by dialing "81+the missing-call short message notification number" and cancel the service by dialing "80+the missing-call short message notification number". In this case, the HLR checks whether a user has subscribed to the short message notification service for missing calls.

When the user sets the call forward number as the missing-call short message notification number in Block 301, the user may register the call forward in the HLR and set the missing-call short message notification number allocated by the MCND to be the call forward number if the user is in a mobile communication network; the user may register the call forward in the exchange at the end office and set the missing-call short message notification number allocated by the MCND to be the call forward number if the user is in a public telephone network. In addition, in a mobile communication network, the switching device is the MSC, VLR or HLR; while in a public telephone network, the switching device is the exchange at the end office.

When registering the call forward, the user may register only Call Forward Busy (CFB), which means that a missing-call short message is sent only when the user is busy; the user may also register only Call Forward No Answer (CFNA), which means that a missing-call short message is sent only in such cases that the user turns off the terminal, the user is outside the service area, or the user has subscribed to the DND service; the user may also register only Call Forward Unconditional (CFU), which means that a missing-call short message is sent once a calling user calls the user and is to be used when it is not convenient for the user to answer the call; the user may also register the number of Call Forward Default (CFD) (including CFNA and CFB), which means that a missing-call short message is sent in such cases that the user is busy, the user turns off the terminal, the user is outside the service area, or the user has subscribed to the DND service. Information about the above various cases in which the short message notification service for missing calls needs to be applied is stored in the HLR generally; and when the calling user is in an inaccessible state, the HLR determines, based on the stored information, which of the above cases the inaccessible state is based on the stored information.

Figure 4:
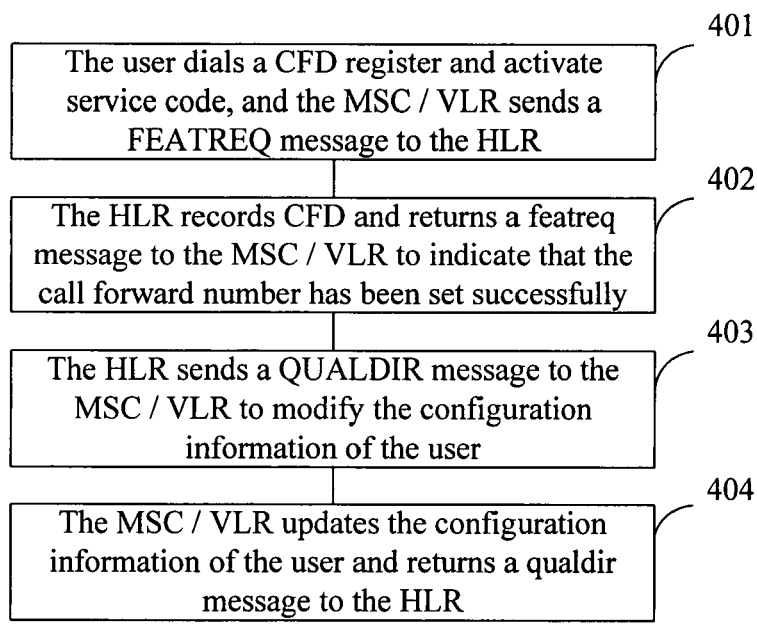
FIG. 4 is a flow chart of a user registering a default call forward with a FEATURE operation method.

While registering the call forward in the HLR, the user may directly perform the registration on the HLR operation desk or perform the registration with the FEATURE operation method. FIG. 4 shows the flow chart of a user registering CFD with the FEATURE operation method. As shown in FIG. 4, the method includes:

Block 401: the user dials a CFD register and activate service code, and the MSC/VLR sends to the HLR a service quest (FEATREQ) message, in which the call forward number is the missing-call short message notification number.

Block 402: the HLR records CFD and returns a service request result (featreq) message to the MSC/VLR to indicate that the call forward number has been set successfully.

Block 403: the HLR sends a qualification direction (QUALDIR) message, which contains a call service indication (CFI) for activating the CFD, to the MSC/VLR to modify configuration information of the user.

Block 404: the MSC/VLR updates the configuration information of the user upon receiving the QUALDIR message, and then returns a qualification direction result response (qualdir) message to the HLR.

The call information of the calling user sent by the switching device to the MCND based on the set call forward number in Block 302 contains at least the calling number and the current time.

The missing-call short message constructed by the MCND based on the call information of the calling user in Block 303 contains at least the calling number and the current time. When sending the constructed missing-call short message to the called user, in a mobile communication network, the MCND first sends the missing-call short message to the called home SMC in general, and the called home SMC sends the missing-call short message to the called user when the called user is accessible; in a public telephone network, the MCND directly sends the missing-call short message to the called user in general.

In order to make clearer the method for realizing the short message notification service for missing calls provided by embodiments of the present invention, the technical solutions provided by the embodiments of the present invention will be described in detail in conjunction with specific embodiments and with reference to the drawings.

Figure 5:
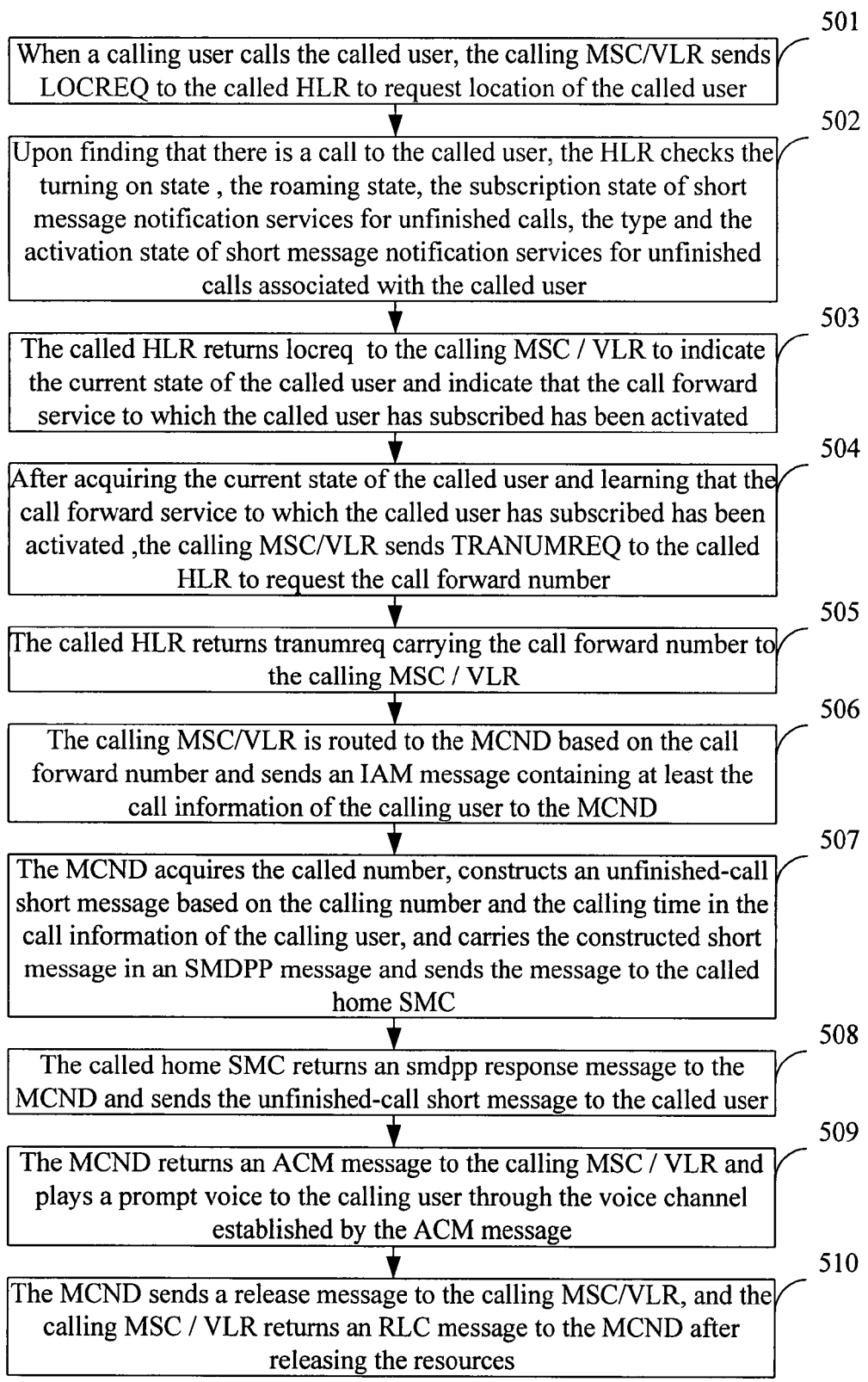
FIG. 5 is a flow chart of the short message notification service for missing calls in accordance with an embodiment of the present invention.

FIG. 5 shows the flow chart of the method for realizing the short message notification service for missing calls in accordance with an embodiment of the present invention. In this embodiment, the missing-call short message notification number has the format of the combination of a prefix and the called number, and the user has subscribed to the short message notification service for missing calls in the HLR. The method includes:

Block 501: when a calling user calls the called user, the calling MSC/VLR sends a location request (LOCREQ) message to the called HLR to request the location of the called user.

Block 502: upon receiving the LOCREQ message and determining that there is a call to the called user, the HLR checks the turning on state, the roaming state, the subscription state of the short message notification service for missing calls, the type and the activation state of the short message notification service for missing calls associated with the user the user. The checking step specifically includes:

a1: the HLR checks whether the user has turned on the terminal; if the user has turned on the terminal, the step b1 is performed; otherwise, the step d1 is performed;

b1: the HLR checks whether the called user is roaming; if the called user is roaming, the step c1 is performed; otherwise, the step d1 is performed;

c1: the HLR sends a route request (ROUTREQ) message to the MSC/VLR of the place where the user is roaming so as to acquire a Temporary Local Directory Number (TLDN) of the called user; the step d1 is performed if the HLR fails to acquire the TLDN; otherwise, the MSC/VLR of the place where the called user is roaming returns the TLDN of the called user to the HLR, and the HLR returns the TLDN of the called user to the calling MSC/VLR, the calling MSC/VLR establishes, based on the received TLDN, a call between itself and the MSC/VLR of the place where the called user is roaming; if the call is established successfully, an ordinary call procedure is performed; otherwise, the step d1 is performed;

d1: the HLR checks whether the called user has subscribed to the short message notification service for missing calls; if the called user has subscribed to the short message notification service for missing calls, the step e1 is performed; otherwise, this procedure is terminated;

e1: the HLR checks which one of the short message notification services for missing calls associated with CFB, CFNA, CFU or CFD the called user has subscribed to, and checks whether the subscribed notification service has been activated; if the called user has subscribed to anyone of the above mentioned notification services and the subscribed service has been activated, Block 503 is performed; otherwise, the procedure is terminated.

Block 503: the called HLR returns a location request result (locreq) message to the calling MSC/VLR to indicate the current state of the called user and indicate that the call forward service to which the called user has subscribed has been activated.

Block 504: upon acquiring the current state of the called user and leaning that the call forward service to which the called user has subscribed has been activated, the calling MSC/VLR sends a call forward number request (TRANUMREQ) message to the called HLR to request the call forward number.

Block 505: the called HLR returns a call forward number request result (tranumreq) message carrying the call forward number that is the missing-call short message notification number to the calling MSC/VLR.

Block 506: after receiving the tranumreq message, the calling MSC/VLR sends route information to the MCND based on the prefix portion of the tranumreq message containing the call forward number, wherein the route information contains at least the missing-call short message notification number; and the calling MSC/VLR sends to the MCND an IAM message containing at least the call information of the calling user, wherein the call information of the calling user contains at least the calling number and the current time.

It is possible that the IAM message in the ISUP relay signaling does not carry the call information of the calling user. In this case, the MCND sends an information request (INR) message to the calling MSC/VLR to request the call information of the calling user; after receiving the INR message, the MSC/VLR carries the call information of the calling user in an information request response (INF) message and returns the information request response (INF) message to the MCND.

Block 507: the MCND directly acquires the called number based on the called number portion of the call forward number contained in the route information, constructs the missing-call short message based on the calling number xxx and the current time in the call information of the calling user. For example, the missing-call short message may be constructed as "A number xxx calls at a certain time". The MCND carries the constructed missing-call short message in an SMDPP message and sends the message to the called home SMC.

Block 508: after receiving the SMDPP message, the called home SMC returns a smdpp response message to the MCND to indicate that the missing-call short message has been received, and sends the missing-call short message to the called user if the called user is accessible; if the called user is currently inaccessible, the called home SMC buffers the short message and automatically sends the buffered short message to the called user once the called user is accessible.

Block 509: the MCND returns an address complete (ACM) message to the calling MSC/VLR to indicate that the complete IAM message has been received, and then plays a prompt voice, such as "the called user has been notified", to the calling user with the voice channel established by the ACM message.

Block 510: the MCND sends a release (REL) message to the calling MSC/VLR to indicate that the relay is to be released and the voice channel is to be removed; after releasing the resources, the calling MSC/VLR returns an RLC message to the MCND to indicate that the release has been implemented.

In the above embodiment, a user subscribes to the short message notification service for missing calls in the home HLR, and the home HLR checks whether a user has subscribed to the short message notification service for missing calls. If a user subscribes to the short message notification service for missing calls in the MCND, then the MCND checks whether a user has subscribed to the short message notification service for missing calls.

Figure 6:
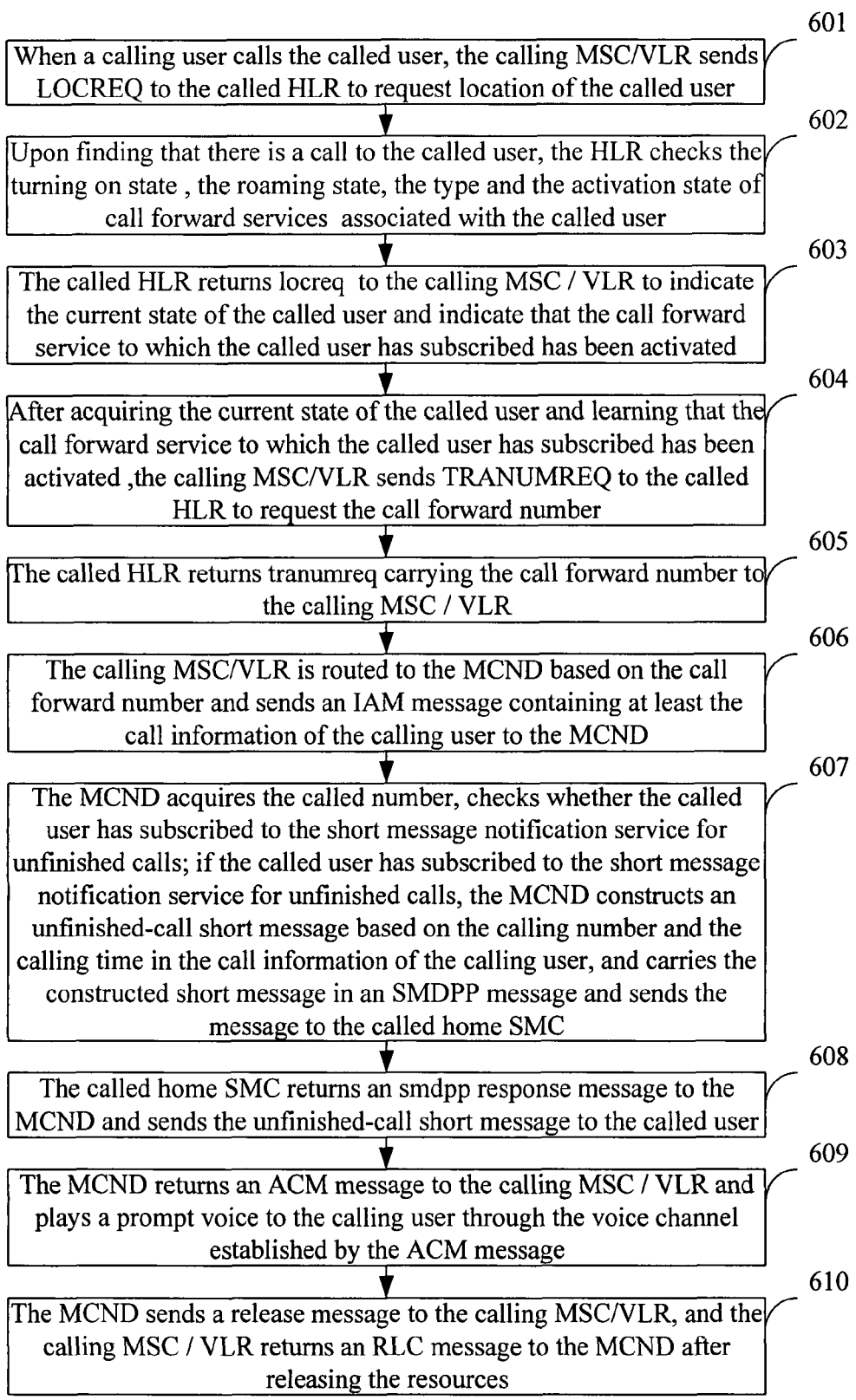
FIG. 6 is a flow chart of the short message notification service for missing calls in accordance with another embodiment of the present invention.

FIG. 6 shows the flow chart of the method for realizing the short message notification service for missing calls in accordance with another embodiment of the present invention. As shown in FIG. 6, the method is almost the same as that shown in FIG. 5 and there are only the following differences between them.

Block 602 is to adjust Block 502 as: the HLR checks the turning on state, the roaming state, the type and the activation state of the short message notification service for missing calls associated with the user. The checking step specifically includes:

a2: the HLR checks whether the user has turned on the terminal; if the user has turned on the terminal, the step b2 is performed; otherwise, the step d2 is performed;

b2: the HLR checks whether the called user is roaming; if the called user is roaming, the step c2 is performed; otherwise, the step d2 is performed;

c2: the HLR sends an ROUTREQ message to the MSC of the place where the user is roaming so as to acquire a TLDN of the called user; the step d2 is performed if the HLR fails to acquire the TLDN; otherwise, the MSC of the place where the called user is roaming returns the TLDN of the called user to the HLR, and the HLR returns the TLDN of the called user to the calling MSC/VLR; the calling MSC/VLR establishes, based on the received TLDN, a call between itself and the MSC/VLR of the place where the called user is roaming; if the call is established successfully, an ordinary call procedure is performed; otherwise, the step d2 is performed;

d2: the HLR checks which call forward service among CFB, CFNA, CFU and CFD the called user has subscribed to, and checks whether the subscribed call forward service has been activated; if the called user has subscribed to anyone of the above mentioned call forward services and the subscribed call forward service has been activated, Block 603 is performed; otherwise, the procedure is terminated.

Block 607 is to adjust Block 507 as follows. The MCND directly acquires the called number based on the called number portion of the call forward number contained in the route information, and checks whether the called user has subscribed to the short message notification service for missing calls based on the subscription information stored therein. If the called user has subscribed to the short message notification service for missing calls, the MCND constructs the missing-call short message based on the calling number xxx and the current time in the call information of the calling user. For example, the missing-call short message may be constructed as "A number xxx, calls at a certain time. The MCND carries the constructed missing-call short message in an SMDPP message and sends the message to the called home SMC. If the called user has not subscribed to the short message notification service for missing calls, this procedure is terminated.

In the described two embodiments of the present invention, the MCND includes not only a database module 105, but also a voice module 106. The database module 105 may store subscription information of users which may be used to check whether the users have subscribed to the short message notification service for missing calls; the voice module 106 is used for playing a prompt voice, such as "the called user has been notified", to the calling user. In practical applications, since the above two modules implement additional service functions having no direct influence with respect to achieving the objective of embodiments of the present invention, it is not necessary for the MCND to include both or any one of the above two modules. Such technical solutions have the same technical idea as those described above, and thus should be covered by the protection scope of the present invention.

In addition, in the described two embodiments of the present invention, the missing-call short message notification number allocated by the MCND for a user has the format of the combination of a prefix and the called number. In practical applications, if the missing-call short message notification number allocated by the MCND for a user has the format of the combination of a prefix and a allocated number, the database module 105 of the MCND should store the corresponding relation between call forward numbers and called numbers. The MCND may acquire the called number based on the call forward number from the corresponding relation between call forward numbers and called numbers after the MSC/VLR is routed to the MCND based on the prefix portion of the call forward number. If the missing-call short message notification number allocated by the MCND for a user has the format of a public number, the IAM message sent by the switching device to the MCND should further contain the called number; the MCND acquires the called number based on the IAM message. Such a technical solution has the same technical idea as those described above, and thus should be covered by the protection scope of the present invention.

In addition, in the descried two embodiments of the present invention, the MCND is set separately as a newly added device in the network. In practical applications, the MCND may be set together with other network devices, such as an MSC. In the case that the MCND is set together with the MSC, the MSC needs to be modified, and specifically, a short message construction module 103 is to be newly added to the MSC and the software of the MSC is to be upgraded. Thus the MSC is enabled to deal with various signaling and procedures in the implementation process of the short message notification service for missing calls. Such technical solution has the same technical idea as those described above, and thus should be covered by the protection scope of the present invention.

In addition, in the described two embodiments of the present invention, the MCND directly acquires the called number based on the called number portion of the call forward number contained in the route information in Blocks 507 or 607, respectively. In practical applications, the MCND may acquire the called number at any time after receiving the route information sent by the calling MSC/VLR and before sending the constructed missing-call short message to the called home SMC. Such technical solution has the same technical idea as those described above, and thus should be covered by the protection scope of the present invention.

In addition, in the described first embodiment of the present invention, after checking the turning on state, the roaming state, the subscription state and the activation state of the call forward service associated with the called user, the HLR checks whether the called user has subscribed to the notification service for missing calls. In the described second embodiment of the present invention, after acquiring the called number and before constructing the missing call short message, the MCND checks whether the called user has subscribed to the notification service for missing calls. In practical applications, the HLR or the MCND may or may not check whether the called user has subscribed to the service for missing calls. In respect of checking whether the called user has subscribed to the notification service for missing calls, if the HLR performs the checking step, the checking step may be performed at any time before the constructed missing-call short message is sent to the called home SMC; if the MCND performs the checking step, the checking step may be performed at any time after the called number is acquired and before the constructed missing-call short message is sent to the called home SMC. Such technical solutions have the same technical idea as those described above, and thus should be covered by the protection scope of the present invention.

As can be seen from the solutions, in the present invention, a missing-call short message notification device, i.e. an MCND, capable of constructing and sending a short message is newly added to the existing network. When a call from a calling user to the called user cannot be put through, the call is forwarded to the MCND through the switching device, and the MCND constructs a missing-call short message containing at least the calling number and the calling time and sends the missing-call short message to the called user.

With the present invention, since the MCND capable of constructing and sending a missing-call short message is newly added to the existing network and other devices in the existing network need not to be altered, the influence on the existing network is minimized, and it is easy to implement the present invention with a low cost, which is very favorable for the spreading and application of the notification service for missing calls.

The called user may in time acquire enough call information of the calling user since the MCND sends a missing-call short message containing at least the calling number and the calling time to the called user; moreover, a call is not put through in the process of the short message notification service for missing calls and both the calling user and the called user are not charged, which is very favorable for the spreading and application of the notification service for a missing call.

Moreover, when setting the missing-call short message notification number to be the call forward number, a user may flexibly set the missing-call short message notification number to be various call forward numbers, such as the number of Call Forward Busy, the number of Call Forward No Answer, the number of Call Forward Unconditional, or the number of Call Forward Default, and thus the user may flexibly select the situation when the short message notification service for missing calls is to be performed, which is also very favorable for the spreading and application of the notification service for missing calls.

The purpose, technical solution and merits of the present invention have been further described in detail by the above specific embodiments. It should be appreciated that the foregoing is only specific embodiments of the present invention and is not for limiting the present invention. Any modification, equivalent substitution, improvement within the spirit and principle of the present invention should be covered in the protection scope of the present invention.

What is claimed is:

1. A missing-call short message notification device, comprising:
   a main control module capable of controlling and scheduling other modules in the device;
   a relay signaling processing module capable of receiving, from a switching device, a call information of a calling user when a called user is not available, sending the call information of the calling user to the main control module, and sending information to the switching device based on an instruction of the main control module, wherein the call information of the calling user comprises a calling number and a time of call, wherein the call information is received based on a call forward number, and wherein the call forward number is allocated by the missing-call short message notification device and set as an unfinished-call short message notification number;
   a short message constructing module capable of constructing a missing-call short message based on an instruction of the main control module, and sending the missing-call short message to a short message sending module through the main control module;
   the short message sending module capable of sending the missing-call short message constructed by the short message constructing module to a called user;
   wherein the relay signaling processing module, the short message constructing module and the short message sending module directly communicate with the main control module, respectively.

2. The device of claim 1, further comprising:
   a database module capable of storing data, wherein the database module is directly connected to the main control module, and stores and outputs data based on an instruction of the main control module.

3. The device of claim 1, further comprising:
   a voice module capable of playing a voice, wherein the module is directly connected to the main control module, and plays the voice based on an instruction of the main control module.

4. A method for realizing a short message notification service for missing calls, comprising:
   sending, by a switching device, a call information of a calling user to a missing-call short message notification device based on a call forward number when a call from the calling user to a called user is not available to the called user, wherein the call information of the calling user comprises a calling number and a time of the call, and wherein the call forward number is set to be an unfinished-call short message notification number that is allocated by the missing-call short message notification device; and
   constructing, by the missing-call short message notification device, a missing-call short message based on the call information of the calling user and sending the constructed missing-call short message to the called user.

5. The method of claim 4, wherein the missing-call short message notification number is allocated for the called user by the missing-call short message notification device based on an application of the called user before the called user registers a call forward, or the missing-call short message notification number is allocated for the called user by the missing-call short message notification device based on a triggering of a communication system when the called user activates the short message notification service for missing calls.

6. The method of claim 4, wherein the process of setting the call forward number to be the missing-call short message notification number comprises:

setting a number of Call Forward Busy, a number of Call Forward No Answer, a number of Call Forward Unconditional, or a number of Call Forward Default to be the missing-call short message notification number.

7. The method of claim 4, wherein the process of sending the call information of the calling user to the missing-call short message notification device based on the set call forward number comprises:

sending, by the switching device, an initial address message containing at least the call information of the calling user to the missing-call short message notification device based on the set call forward number; or after receiving an information request message from the missing-call short message notification device, carrying, by the switching device, based on the set call forward number, the call information of the calling user in an information request response message and returning the information request response message to the missing-call short message notification device.

8. The method of claim 4, wherein the missing-call short message notification number has a format of a combination of a prefix and a called number, before the process of sending the constructed missing-call short message to the called user, the method further comprises:

acquiring, by the missing-call short message notification device, the called number based on a called number portion of the call forward number.

9. The method of claim 4, wherein the missing-call short message notification number has a format of a combination of a prefix and an allocated number, before the process of sending the constructed missing-call short message to the called user, the method further comprises:

acquiring, by the missing-call short message notification device, a called number based on the call forward number from a corresponding relation between call forward numbers and called numbers stored in a database module.

10. The method of claim 4, wherein the missing-call short message notification number has a format of a public number, the switching device provides the missing-call short message notification device with information about the called user, and before the process of sending the constructed missing-call short message to the called user, the method further comprises:

acquiring, by the missing-call short message notification device, the called number based on the information of the called user provided by the switching device.

11. The method of claim 4, wherein subscription information indicating that the called user has subscribed to the short message notification service for missing calls is stored in the missing-call short message notification device, and accordingly, the method further comprises:

checking, by the missing-call short message notification device, based on the subscription information stored therein, whether the called user has subscribed to the short message notification service for missing calls; if the called user has subscribed to the short message notification service for missing calls, continuing with the process of constructing the missing-call short message and sending the constructed missing-call short message to the called user; otherwise, terminating this procedure.

12. The method of claim 4, wherein subscription information indicating that the called user has subscribed to the short message notification service for missing calls is stored in a called Home Location Register, and accordingly, before sending the call information of the calling user to the missing-call short message notification device, the method further comprises:

checking, by the called Home Location Register, whether the called user has subscribed to the short message notification service for missing calls; if the called user has subscribed to the short message notification service for missing calls, continuing with the process of sending the calling information of the calling user to the missing-call short message notification device based on the call forward number; otherwise, terminating this procedure.

13. The method of claim 4, after the process of sending the constructed missing-call short message to the called user, further comprising:

returning, by the missing-call short message notification device, an address complete message to the switching device and playing a prompt voice to the calling user after returning the address complete message.

\* \* \* \* \*